(12) United States Patent
Chiu et al.

(10) Patent No.: US 9,791,060 B2
(45) Date of Patent: Oct. 17, 2017

(54) TOUCH FAUCET

(71) Applicant: Globe Union Industrial Corp., Taichung (TW)

(72) Inventors: Huiling Chiu, Taichung (TW); Chiahua Yuan, Taichung (TW); Yiping Lin, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 0 days.

(21) Appl. No.: 15/237,739

(22) Filed: Aug. 16, 2016

(65) Prior Publication Data

US 2017/0059051 A1 Mar. 2, 2017

(30) Foreign Application Priority Data

Aug. 25, 2015 (TW) .................................. 104127756

(51) Int. Cl.

| | |
|---|---|
| E03B 1/00 | (2006.01) |
| F16K 21/06 | (2006.01) |
| E03C 1/04 | (2006.01) |
| F16K 11/074 | (2006.01) |
| E03C 1/05 | (2006.01) |

(52) U.S. Cl.
CPC ............ *F16K 21/06* (2013.01); *E03C 1/0412* (2013.01); *E03C 1/055* (2013.01); *F16K 11/074* (2013.01); *E03C 2001/0415* (2013.01); *E03C 2001/0416* (2013.01)

(58) Field of Classification Search
CPC .......... E03C 1/04; E03C 1/0412; E03C 1/055; F16K 11/207; F16K 21/06

USPC ................. 137/603, 605, 625.4, 625.41, 801
See application file for complete search history.

(56) References Cited

U.S. PATENT DOCUMENTS

| | | | | |
|---|---|---|---|---|
| 4,349,149 A | * | 9/1982 | Humpert | ............... F16K 11/207 137/100 |
| 5,417,348 A | * | 5/1995 | Perrin | .................. B67D 1/0059 137/606 |
| 6,757,921 B2 | * | 7/2004 | Esche | ....................... E03C 1/04 137/625.4 |

(Continued)

FOREIGN PATENT DOCUMENTS

| | | |
|---|---|---|
| TW | I228578 B | 3/2005 |
| TW | M382408 U | 6/2010 |

(Continued)

*Primary Examiner* — Reinaldo Sanchez-Medina
(74) *Attorney, Agent, or Firm* — Alan D. Kamrath; Kamrath IP Lawfirm, P.A.

(57) ABSTRACT

A touch faucet contains: a body, a connector, and a touch valve assembly. The body includes an inlet segment, an outlet segment, a first connecting part, a second connecting part, and an accommodation chamber. The connector is housed in the accommodation chamber and includes an inflow portion, a first coupling portion, a second coupling portion, and an outflow portion. The touch valve assembly is connected with the second connecting part and includes a positioning cylinder which has at least one through orifice, a province valve, and a driving post, such that the water flow enters into the at least one through orifice from the first coupling portion via the positioning cylinder. The touch valve assembly also includes an actuation device, at least one part of which extends out of the body so as to be operated by user and to drive the driving post to move.

13 Claims, 14 Drawing Sheets

(56) References Cited

U.S. PATENT DOCUMENTS

| | | | | |
|---|---|---|---|---|
| 7,264,016 B2* | 9/2007 | Molina | .................... | E03C 1/04 137/454.6 |
| 2007/0235091 A1* | 10/2007 | Granot | ................. | E03C 1/0404 137/597 |
| 2008/0276367 A1* | 11/2008 | Bares | ....................... | E03C 1/04 4/677 |
| 2011/0126932 A1* | 6/2011 | Chan | .................. | F16K 11/0746 137/801 |
| 2011/0303305 A1* | 12/2011 | Chen | .................... | E03C 1/0403 137/334 |
| 2013/0186496 A1* | 7/2013 | Hsu | .......................... | E03C 1/04 137/801 |
| 2014/0007967 A1* | 1/2014 | Sun | ........................ | E03C 1/102 137/801 |

FOREIGN PATENT DOCUMENTS

| | | |
|---|---|---|
| TW | M432670 | 7/2012 |
| TW | I369459 B | 8/2012 |
| TW | M452280 U | 5/2013 |

* cited by examiner

TOUCH FAUCET

FIELD OF THE INVENTION

The present invention relates to a faucet, and more particularly to a touch faucet.

BACKGROUND OF THE INVENTION

A conventional control valve for a spray head of a faucet is manufactured at high cost and is complicated. Accordingly, improved touch control valves were disclosed in TW Patent Nos. M432670, I228578, I369459, M452280 and M382408, respectively. The improved touch control valves are an automatic valve or a manual-operated valve, wherein when the touch control valves are the manual-operated valve, water supply is stopped by touching an actuation element, after starting the water supply. When the touch control valves are the automatic valve, the water supply is stopped automatically by way of water pressure change after a period of using time.

In addition, one touch control valves are sold by many companies, such as 3M, wherein each one touch control valve is fixed on an outlet of the faucet and the water supply is started or stopped by manually touching an actuation element in the control valve, thus causing contamination to the actuation element.

A conventional faucet contains a handle and a central shaft driven by the handle so as to control water supply or to adjust temperature of the water supply. However, the central shaft is driven by the handle to rotate in a long travel, so the manual-operated valve is used repeatedly and excessive water consumption happens.

A conventional pull-out or non pull-out faucet is fixed in a kitchen or a bathroom and contains an infrared sensor for sensing user's hand, yet the pull-out or non pull-out faucet cannot be controlled as the infrared sensor or a circuit board is broken.

The present invention has arisen to mitigate and/or obviate the afore-described disadvantages.

SUMMARY OF THE INVENTION

The primary objective of the present invention is to provide a touch faucet which is capable of overcoming the shortcomings of the conventional touch faucet.

To obtain the above objective, a touch faucet provided by the present invention contains: a body, a connector, and a touch valve assembly.

The body includes an inlet segment, an outlet segment, a first connecting part, a second connecting part, and an accommodation chamber defined between the first connecting part and the second connecting part.

The connector is housed in the accommodation chamber of the body, and the connector includes an inflow portion configured to guide water flow; a first coupling portion located opposite to the first connecting part of the body and communicating with the inflow portion; a second coupling portion located opposite to the second connecting part of the body and communicating with the first coupling portion; and an outflow portion communicating with the second coupling portion and the outlet segment of the body so that the water flow enters into the outlet segment.

The touch valve assembly is connected with the second connecting part of the body and includes a positioning cylinder joined with the second coupling portion, wherein the positioning cylinder has at least one through orifice communicating with the first coupling portion and the outflow portion, a province valve is in connection with the positioning cylinder and has a driving post configured to drive the province valve, such that the water flow enters into the at least one through orifice from the first coupling portion via the positioning cylinder; the touch valve assembly also includes an actuation device, at least one part of which extends out of the body so as to be operated by user and to drive the driving post of the province valve to move.

Accordingly, the province valve is fixed in the touch valve assembly so that the press member of the actuation device is pressed by the user to drive the driving post of the province valve to move, thus starting and stopping the water quickly. Furthermore, the province valve saves water consumption.

Preferably, the press member is pressed to drive the province valve so as to avoid touching the province valve directly and to maintain cleanness of the province valve.

DETAILED DESCRIPTION OF THE PREFERRED EMBODIMENTS

With reference to FIGS. 1-4, a touch faucet 1 according to a first embodiment of the present invention is a non pull-out faucet which is mounted on a basin in a kitchen or is secured on a fixing wall 2 in a bathroom, and the touch faucet 1 includes a body 10, a connector 20, a control valve assembly 30, and a touch valve assembly 40.

The body 10 includes an inlet segment 11, an outlet segment 12, a first connecting part 13, a second connecting part 14, and an accommodation chamber 15 defined between the first connecting part 13 and the second connecting part 14.

Figure 5:
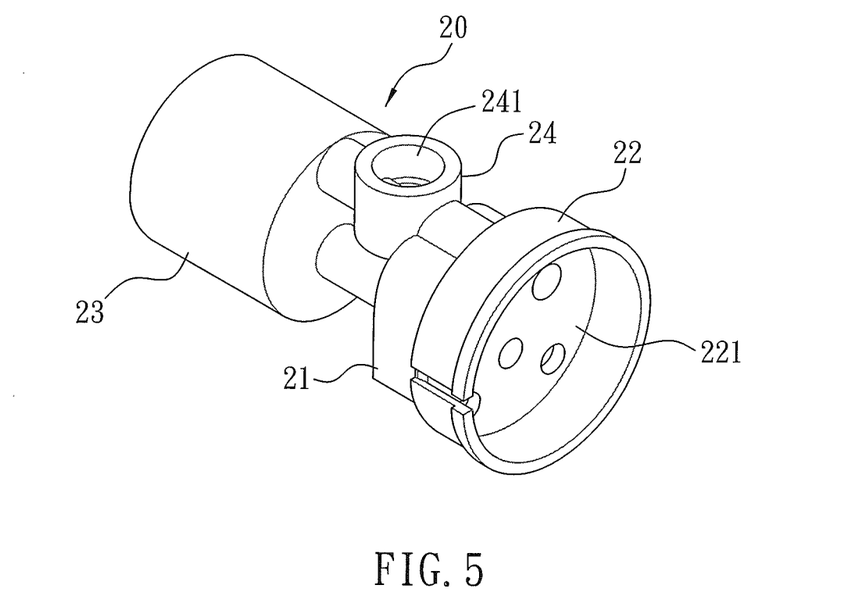
FIG. 5 is a perspective view showing the assembly of a part of the touch faucet according to the first embodiment of the present invention.
Figure 6:
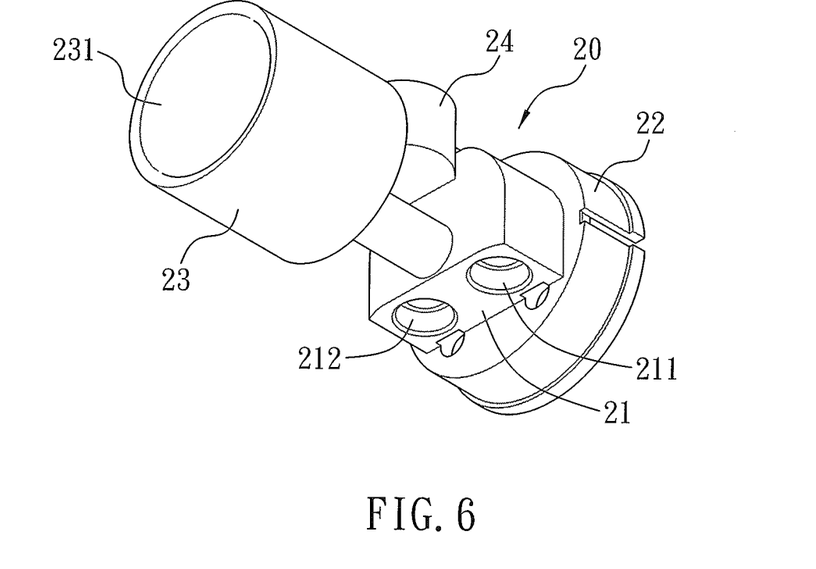
FIG. 6 is another perspective view showing the assembly of a part of the touch faucet according to the first embodiment of the present invention.
Figure 7:
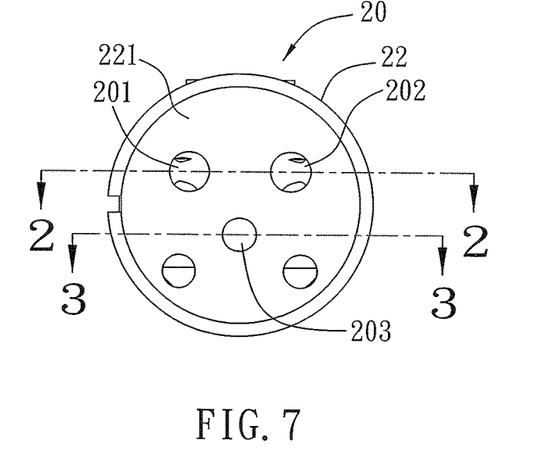
FIG. 7 is a side plane view showing the assembly of a part of the touch faucet according to the first embodiment of the present invention.
Figure 8:
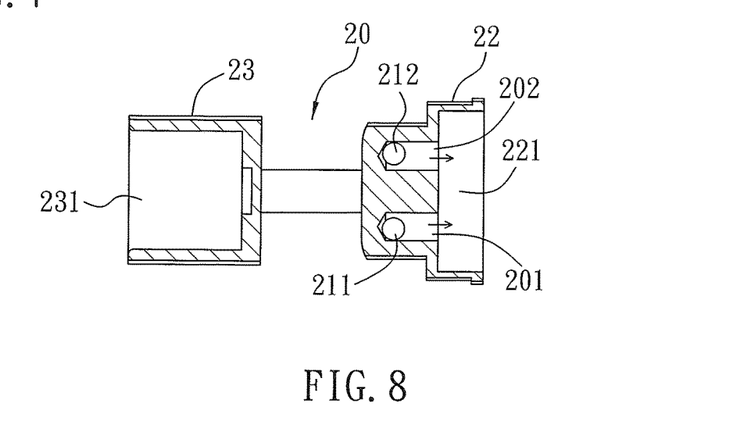
FIG. 8 is a cross sectional view taken along the line of 2-2 of FIG. 7.
Figure 9:
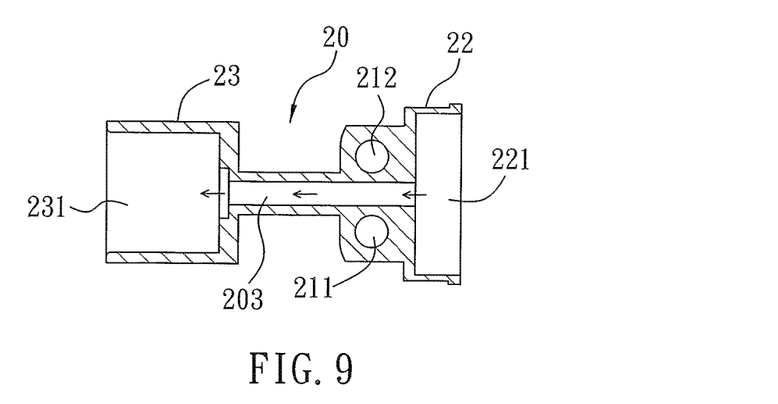
FIG. 9 is a cross sectional view taken along the line of 3-3 of FIG. 7.
Figure 10:
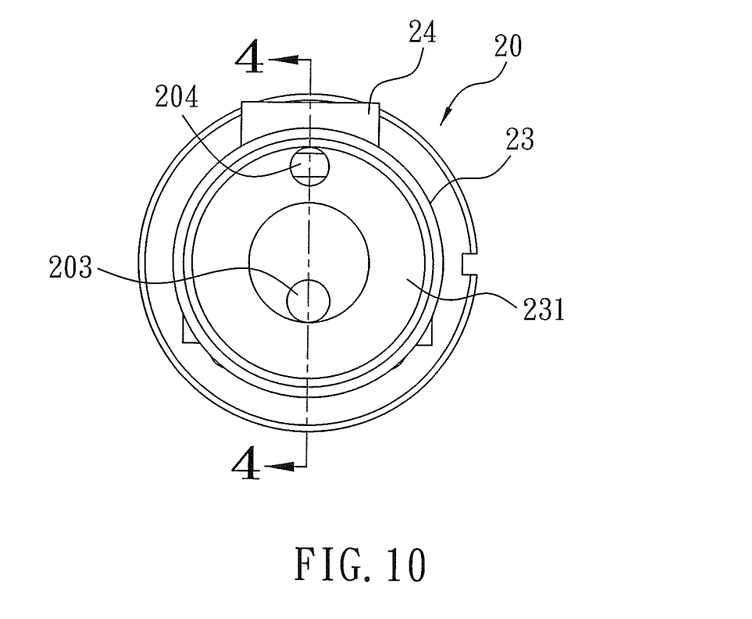
FIG. 10 is another side plane view showing the assembly of a part of the touch faucet according to the first embodiment of the present invention.
Figure 11:
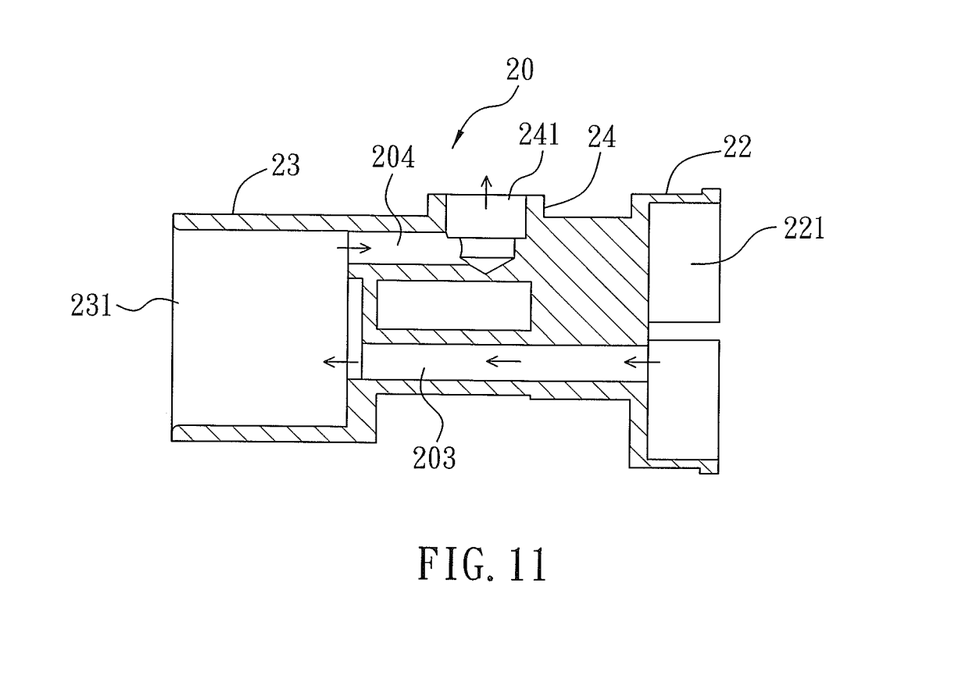
FIG. 11 is a cross sectional view taken along the line 4-4 of FIG. 10.
Figure 12:
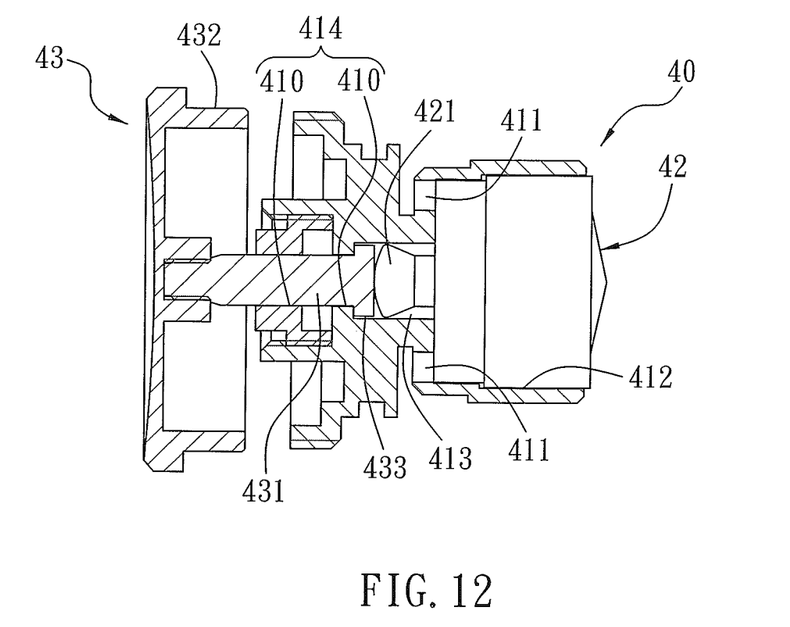
FIG. 12 is a cross sectional view showing the assembly of a part of the touch faucet according to the first embodiment of the present invention.

The connector 20, as shown in FIGS. 5 and 6, is housed in the accommodation chamber 15 of the body 10, and the connector 20 includes an inflow portion 21 configured to guide water flow; a first coupling portion 22 located opposite to the first connecting part 13 of the body 10 and communicating with the inflow portion 21, as illustrated in FIGS. 7-9; a second coupling portion 23 located opposite to the second connecting part 14 of the body 10 and communicating with the first coupling portion 22; and an outflow portion 24 communicating with the second coupling portion 23 and the outlet segment 12 of the body 10, as shown in FIGS. 10 and 11, hence the water flow enters into the outlet segment 12.

The control valve assembly 30 is coupled with the first connecting part 13 of the body 10 so as to control the water flow enters into the second coupling portion 23 from the first coupling portion 22.

The control valve assembly 30 includes a joining part 31 and an operation lever 32 configured to drive the joining part 31.

Figure 13:
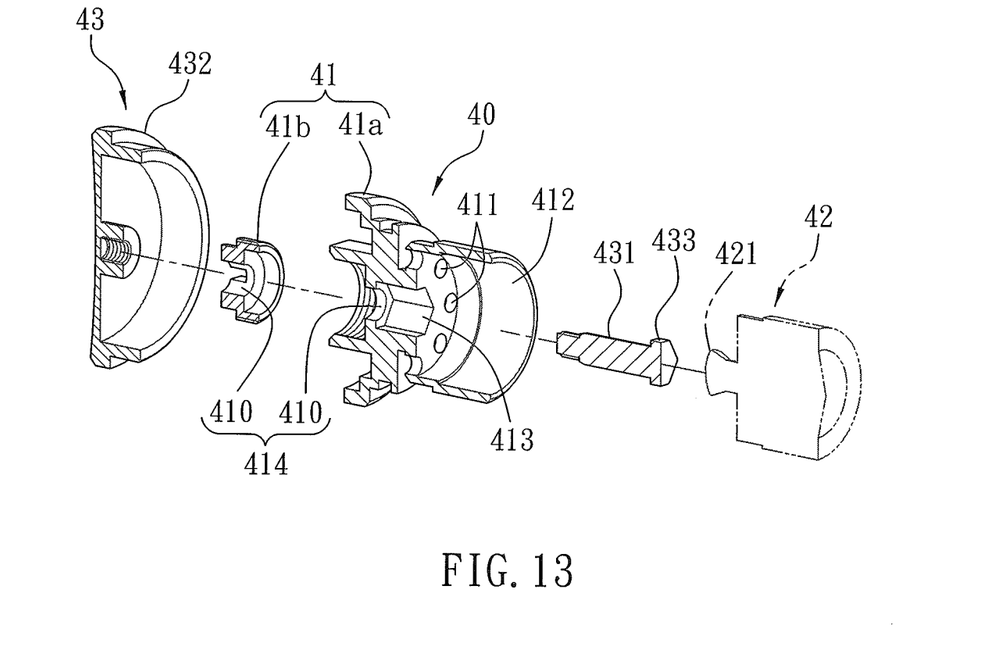
FIG. 13 is a perspective cross-sectional view showing the assembly of a part of the touch faucet according to the first embodiment of the present invention.

The touch valve assembly 40 is connected with the second connecting part 14 of the body 10 and includes a positioning cylinder 41 joined with the second coupling portion 23, wherein the positioning cylinder 41 has at least one through orifice 411 communicating with the first coupling portion 22 and the outflow portion 24. Referring to FIG. 13, a province valve 42 is in connection with the positioning cylinder 41 and has a driving post 421 configured to drive the province valve 42, such that the water flow enters into the at least one through orifice 411 from the first coupling portion 22 via the positioning cylinder 41. The touch valve assembly 40 also includes an actuation device 43, at least one part of which extends out of the body 10 so as to be operated by user and to drive the driving post 421 of the province valve 42 to move.

The touch faucet 1 further comprise a water inflow assembly 50, and the water inflow assembly 50 includes a cold-water inlet pipe 51 and a hot-water inlet pipe 52; the inflow portion 21 of the connector 20 has a cold-water inlet 211 connected with the cold-water inlet pipe 51 so as to guide cold water into the first coupling portion 22, and the inflow portion 21 of the connector 20 has a hot-water inlet 212 coupled with the hot-water inlet pipe 52 so as to guide hot water into the first coupling portion 22. The connector 20 includes a cold-water conduit 201 configured to guide the cold water into the first coupling portion 22 from the cold-water inlet 211. The connector 20 further includes a hot-water conduit 202 configured to guide the hot water into the first coupling portion 22 from the hot-water inlet 212.

Figure 3:
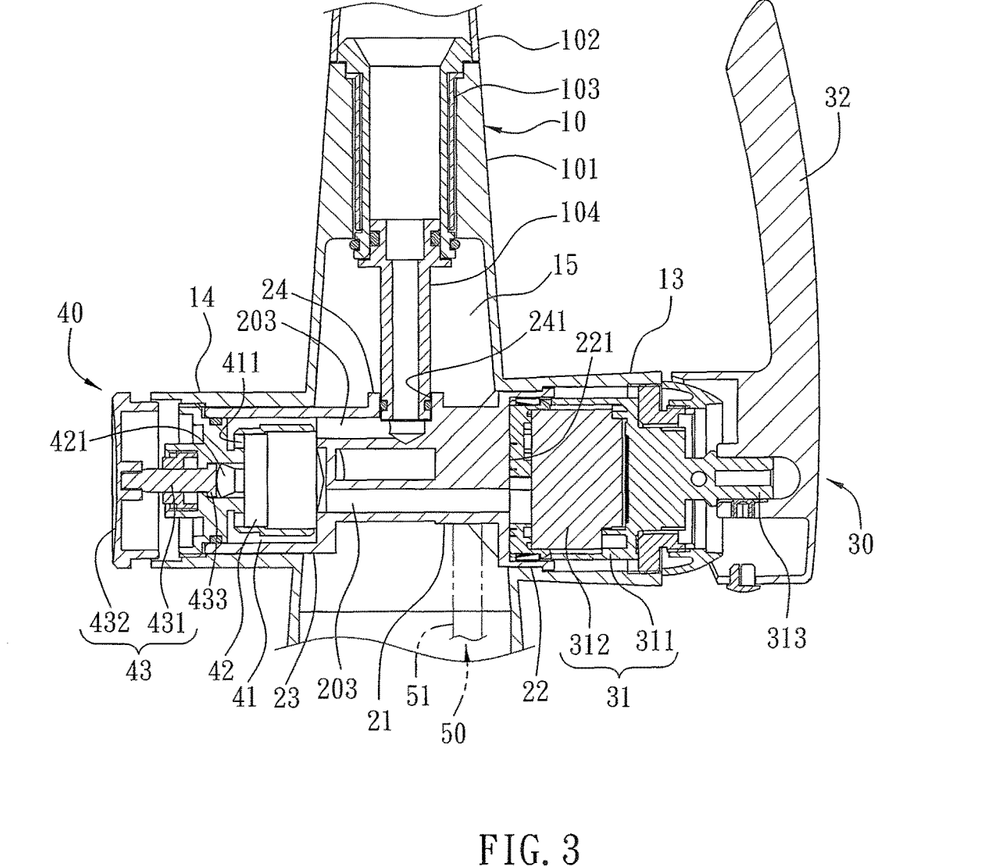
FIG. 3 is an amplified cross-sectional view of a part of FIG. 2.
Figure 4:
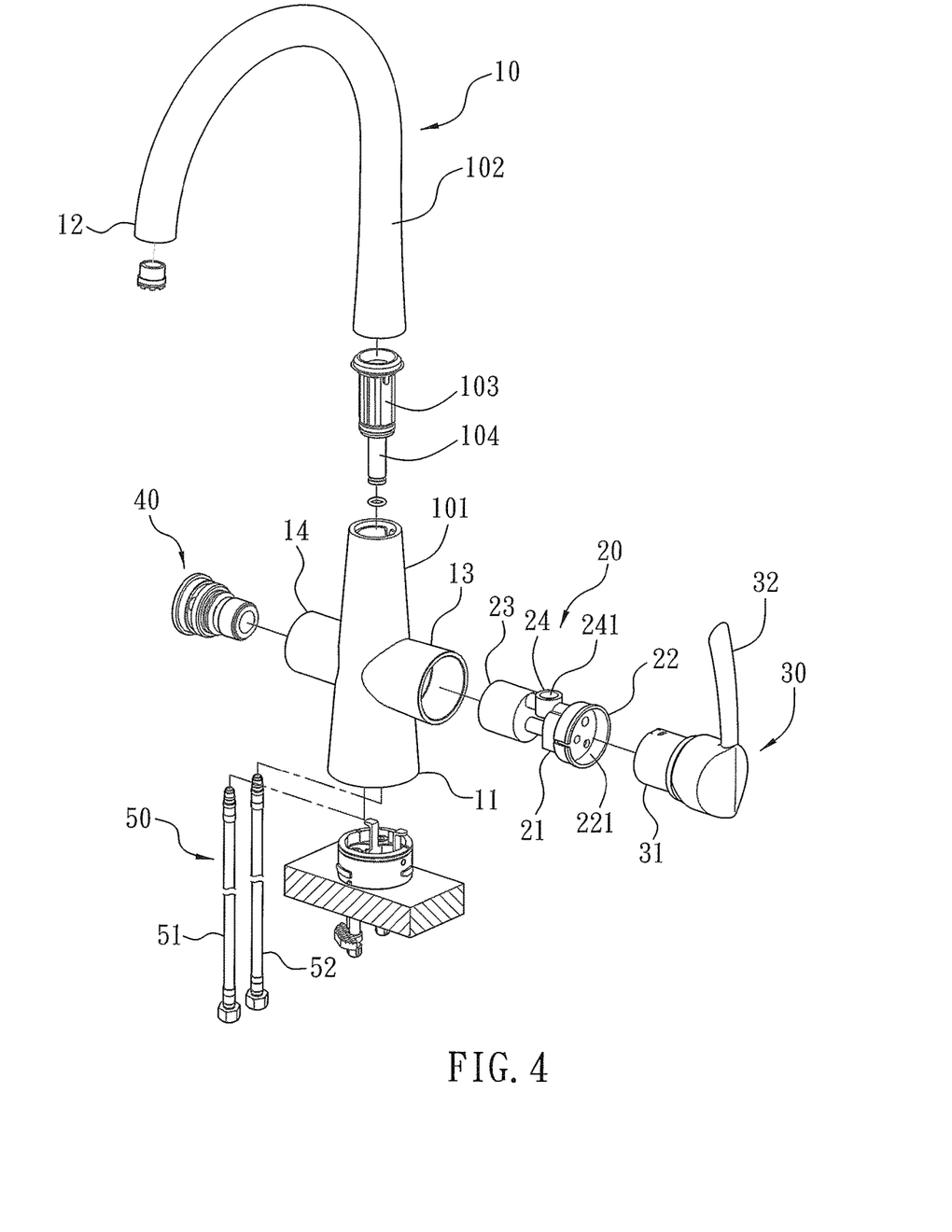
FIG. 4 is a perspective view showing the assembly of a majority of the touch faucet according to the first embodiment of the present invention.

With reference to FIGS. 3 and 4, the first coupling portion 22 has a first retaining groove 221. The control valve assembly 30 is a temperature control valve assembly, and the joining part 31 has a casing 311 defined between the first connecting part 13 and the first retaining groove 221; a valve core 312 mounted in the casing 311; and a rotary shaft 313 extending out of the casing 311 and pulled and rotated by the operation lever 32. For example, the rotary shaft 313 is pulled to start the cold water flowing into the second coupling portion 23 from the cold-water inlet 211 via the joining part 31 and to start the hot water flowing into the second coupling portion 23 from the hot-water inlet 212 via the joining part 31. The rotary shaft 313 is rotated to adjust a mixing temperature and a mixing flow of the cold water and the hot water in the second coupling portion 23. Referring to FIG. 9, the connector 20 further includes a mixing conduit 203 configured to guide mix water of the cold water and the hot water in the first coupling portion 22 into the second coupling portion 23.

Referring to FIGS. 3 and 4, the outflow portion 24 of the connector 20 has an outlet 241, and the body 10 includes a holder 101 and an outlet pipe 102 fitted with the holder 101 on which the inlet segment 11, the outlet segment 12, the first connecting part 13, and the second connecting part 14 form; the outlet pipe 102 forms the outlet segment 12 of the body 10; and the outlet 241 connects with the outlet pipe 102. As shown in FIGS. 10 and 11, the connector 20 further includes a flowing channel 204 configured to guide the mixing water into the outlet 241 of the outflow portion 24 from the second coupling portion 23.

As shown in FIGS. 3 and 4, the body 10 further includes a fitting mount 103 and a fitting column 104 connecting with the fitting mount 103; the fitting mount 103 is accommodated in the holder 101 and is fitted with the outlet pipe 102; and the fitting column 104 is in connection with the outlet 241, such that the outlet 241 of the connector 20 communicates with the outlet pipe 102 and the fitting mount 103 via the fitting column 104.

Figure 1:
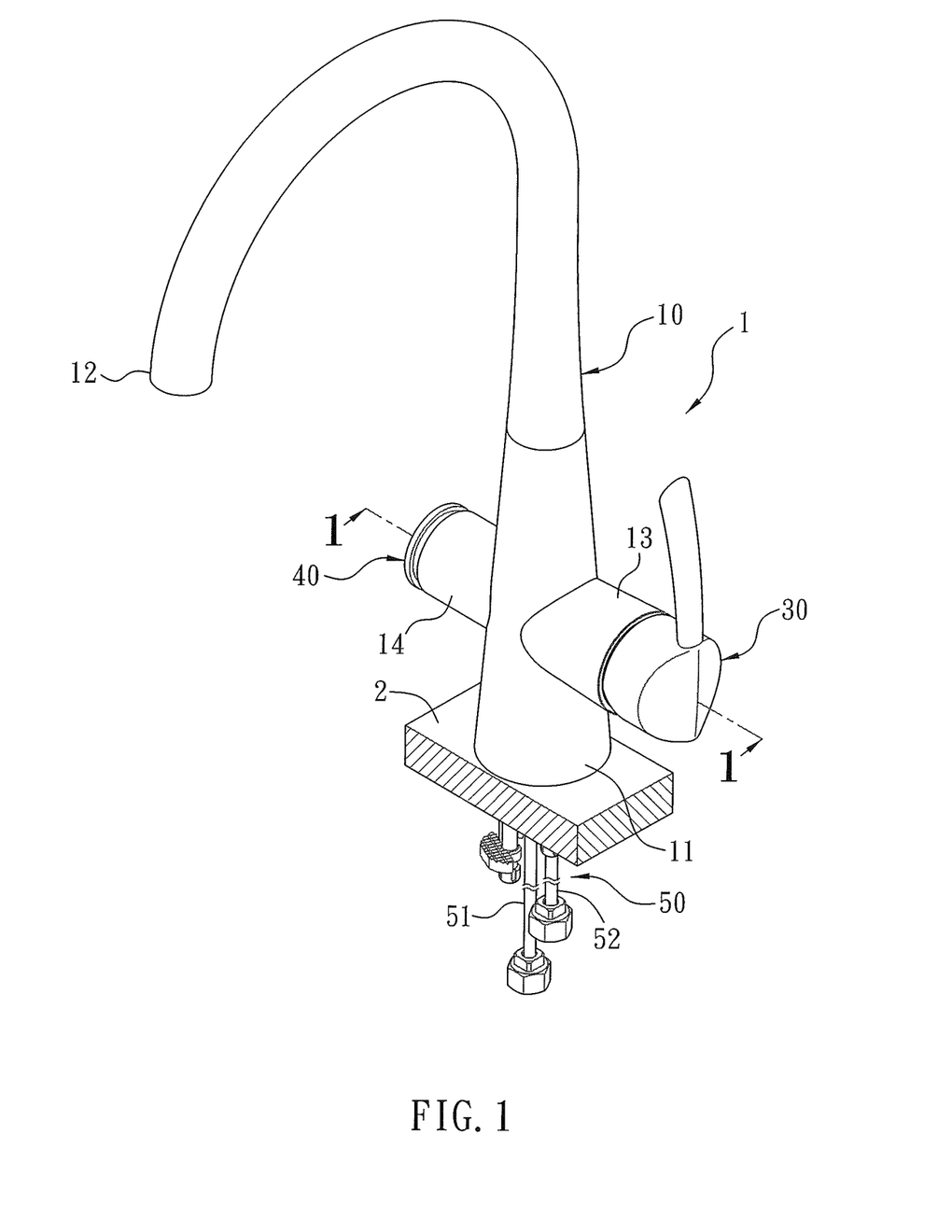
FIG. 1 is a perspective view showing the assembly of a touch faucet according to a first embodiment of the present invention.
Figure 2:
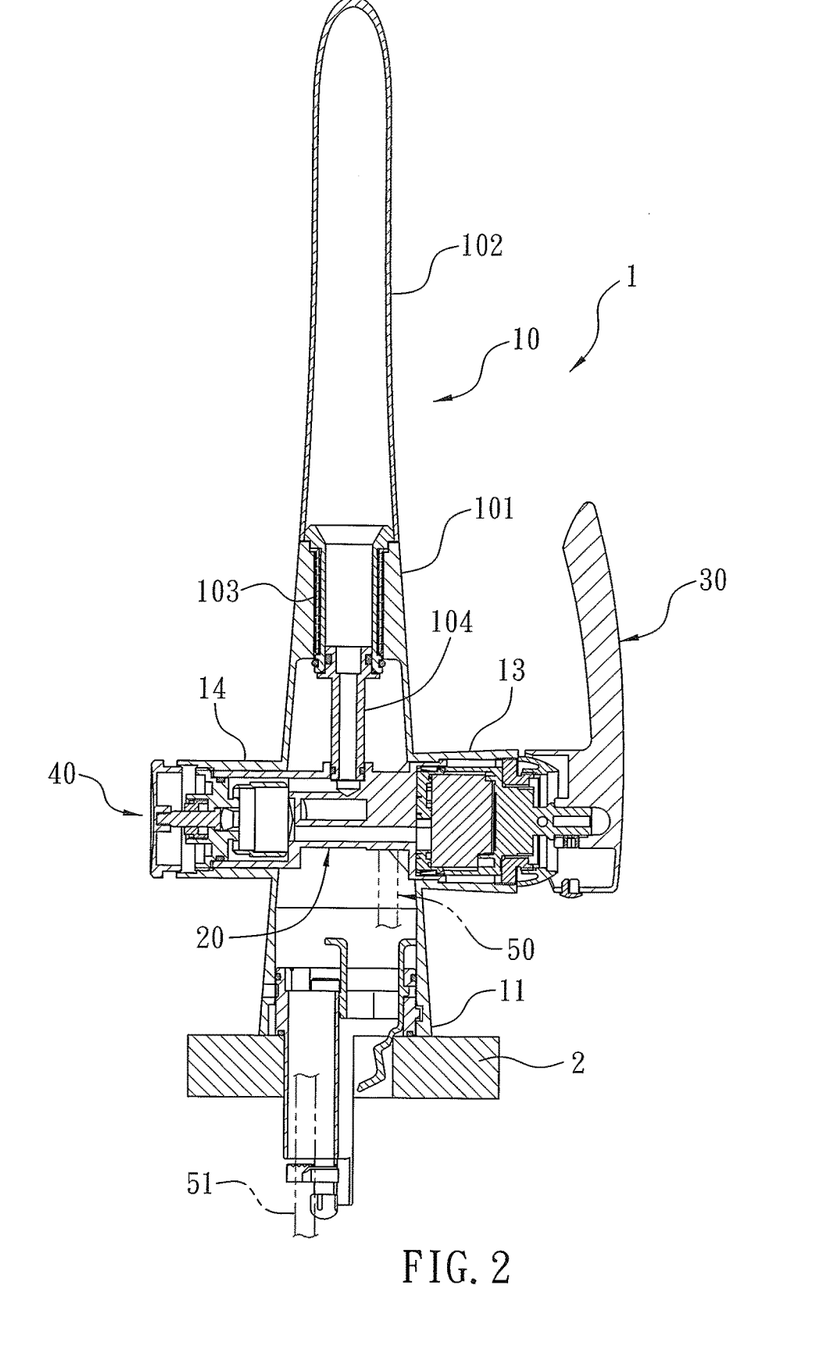
FIG. 2 is a cross sectional view showing the assembly of the touch faucet according to the first embodiment of the present invention.

With reference to FIGS. 10 and 11, the second coupling portion 23 has a second retaining groove 231. As shown in FIGS. 2 and 13, the positioning cylinder 41 includes a housing cavity 412, a receiving groove 413 defined on a bottom of the housing cavity 412, and an aperture 414 passing through a bottom of the receiving groove 413, wherein the at least one through orifice 411 communicates with the second coupling portion 23 via the housing cavity 412. The province valve 42 is accommodated between the housing cavity 412 and the second retaining groove 231, and the driving post 421 is housed in the receiving groove 413. The actuation device 43 includes a drive rod 431 extending into the receiving groove 413 from the aperture 414 so as to drive the driving post 421 of the province valve 42 to move.

Figure 14:
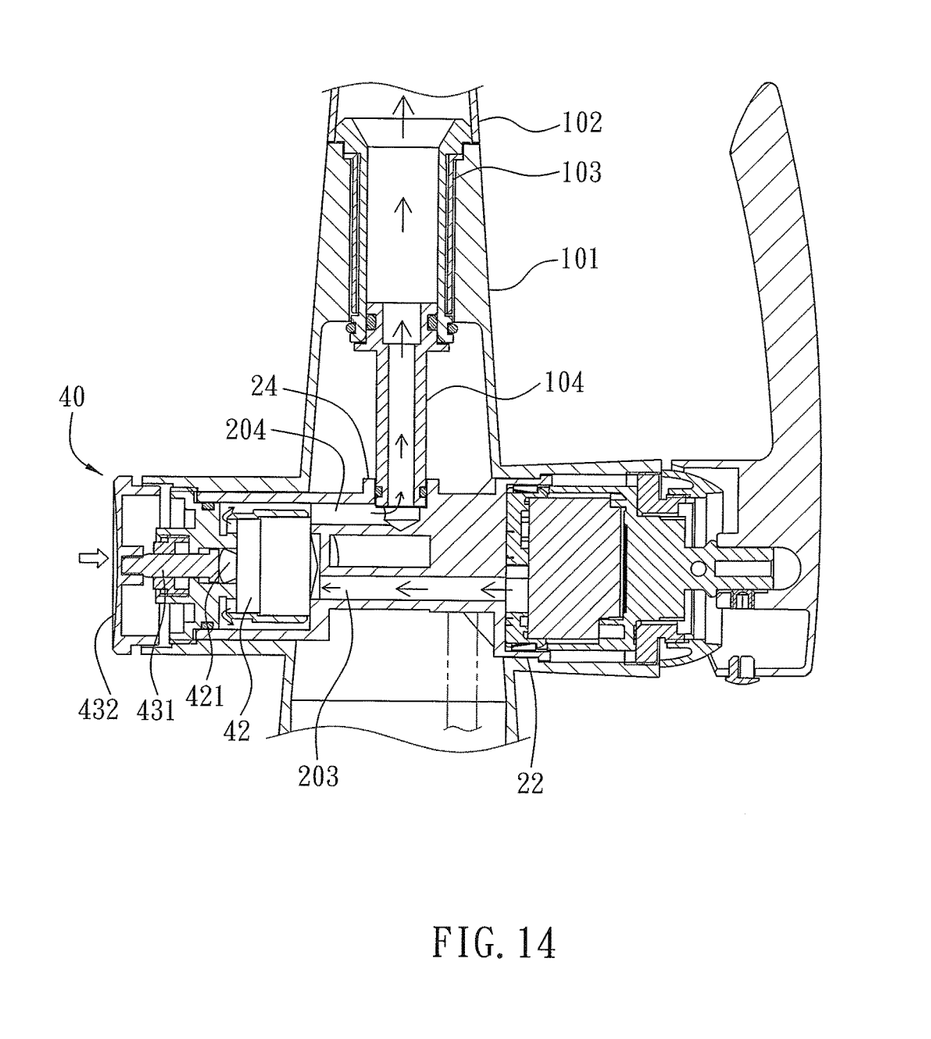
FIG. 14 is a cross sectional view showing the assembly of a part of the touch faucet according to the first embodiment of the present invention.

As illustrated in FIG. 14, the actuation device 43 further includes a press member 432 exposing outside the second connecting part 14 so as to be pressed by the user, and the second connecting part 14 drives the press member 432, wherein the press member 432 is a fitting cap and is pressed by the user. The drive rod 431 has a limiting segment 433 limited in the receiving groove 413 and configured to drive the driving post 421 to move, wherein the limiting segment 433 is polygonal so as to mate with a shape of the receiving groove 413, thus limiting a rotation of the drive rod 431. The press member 432 is screwed with the drive rod 431.

The positioning cylinder 41 has a base 41a forming a majority of the positioning cylinder 41 and has a closing sleeve 41b screwed with the base 41a; wherein each of the base 41a and the closing sleeve 41b has an opening 410 configured to define the aperture 414.

The inflow portion 21 is located on a bottom of the connector 20, the outflow portion 24 is located on a top of the connector 20, hence after the cold-water inlet pipe 51 and the hot-water inlet pipe 52 enter the inlet segment 11 of the body 10, they connect with the cold-water inlet 211 and the hot-water inlet 212 of the connector 20, respectively. Furthermore, the fitting column 104 is in connection with the outlet 241 of the connector 20 easily.

The province valve 42 is an automatic province valve or a manual-operated province valve. For example, when the province valve 42 is the automatic province valve, after the driving post 421 is driven to start the water flow for a period of time, the driving post 421 returns back to an original position so as to stop the water automatically. When the province valve 42 is the manual-operated province valve, the press member 432 is pressed so as to drive the province valve 42 to stop the water flow. Preferably, a returning spring cooperates with the actuation member 43 so that the drive rod 431 and the press member 432 are pushed by the returning spring to move back to their original positions.

Figure 15:
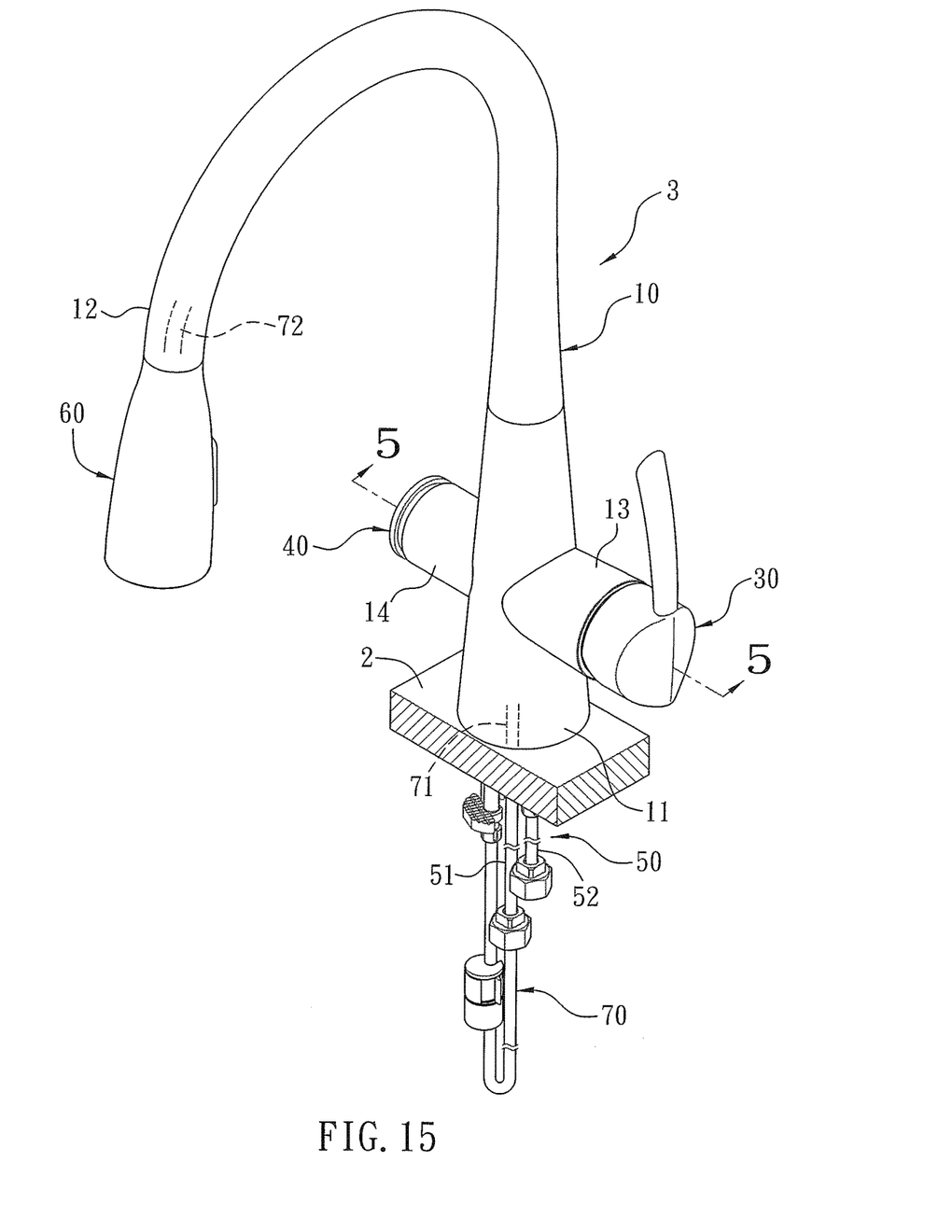
FIG. 15 is a perspective view showing the assembly of a touch faucet according to a second embodiment of the present invention.
Figure 16:
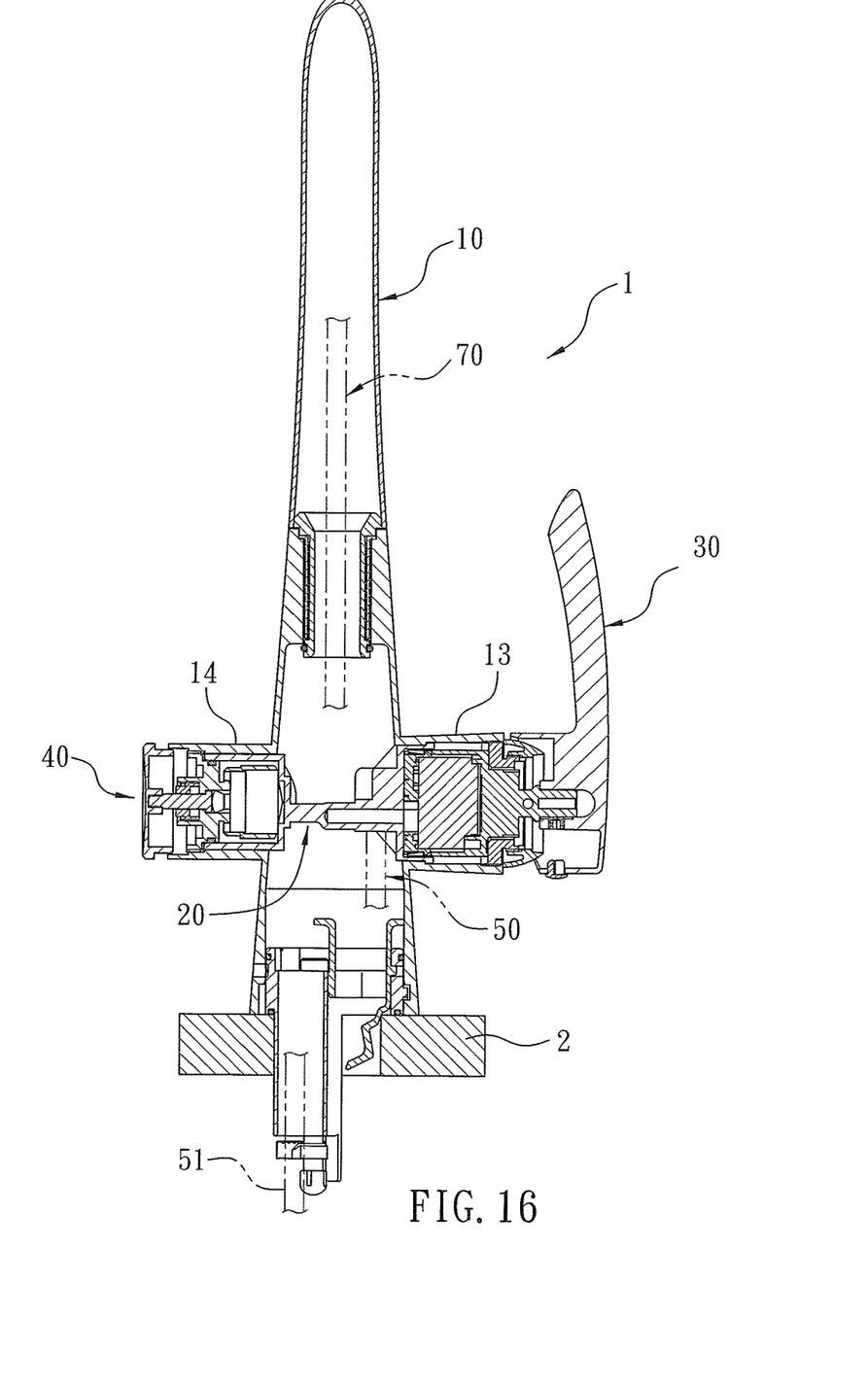
FIG. 16 is a cross sectional view taken along the line of 5-5 of FIG. 15.
Figure 17:
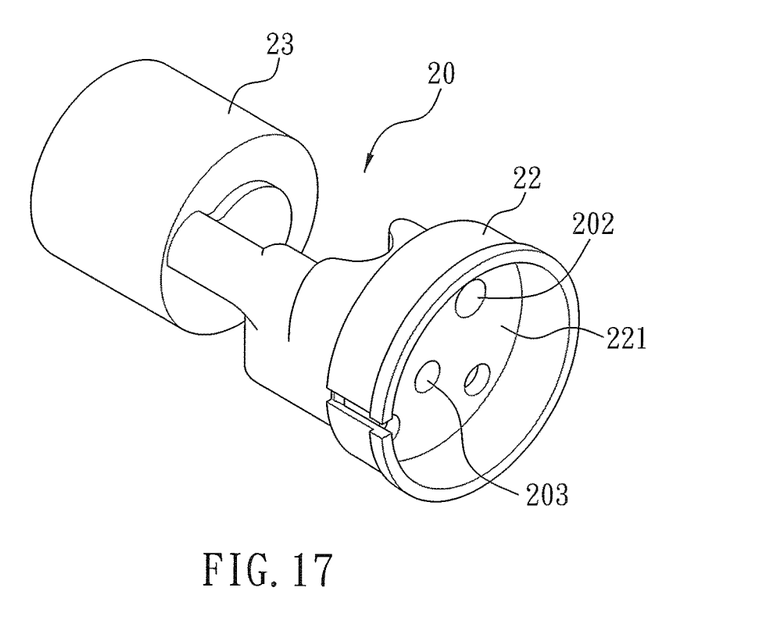
FIG. 17 is a perspective view showing the assembly of a part of the touch faucet according to the second embodiment of the present invention.

With reference to FIGS. 15 and 16, a touch faucet 3 according to a second embodiment of the present invention is a pull-out faucet which is mounted on a basin in a kitchen or is secured on a fixing wall 2 in a bathroom.

A difference of the touch faucet 3 from the touch faucet 1 of the first embodiment comprises:

a spray head 60 pulled out of and retracted back to an outlet segment 12 of a body 10; a hose 70 having a water inflow end 71 and a water outflow end 72, wherein the water outflow end 72 is coupled with the spray head 60 so that the hose 70 is pulled outwardly or is retracted inwardly with the spray head 60. Referring to FIGS. 17 to 22, the outlet 241 of the outflow portion 24 of the connector 20 is joined with the water inflow end 71 of the hose 70 so that the mixing water sprays out of the spray head 60 from the outlet 241 via the hose 70.

Figure 18:
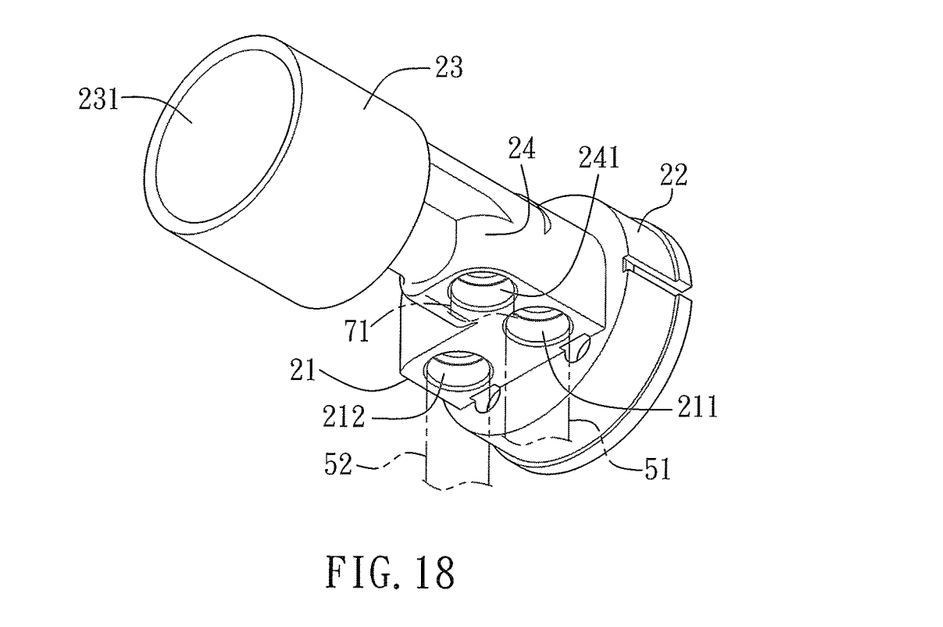
FIG. 18 is another perspective view showing the assembly of a part of the touch faucet according to the second embodiment of the present invention.
Figure 19:
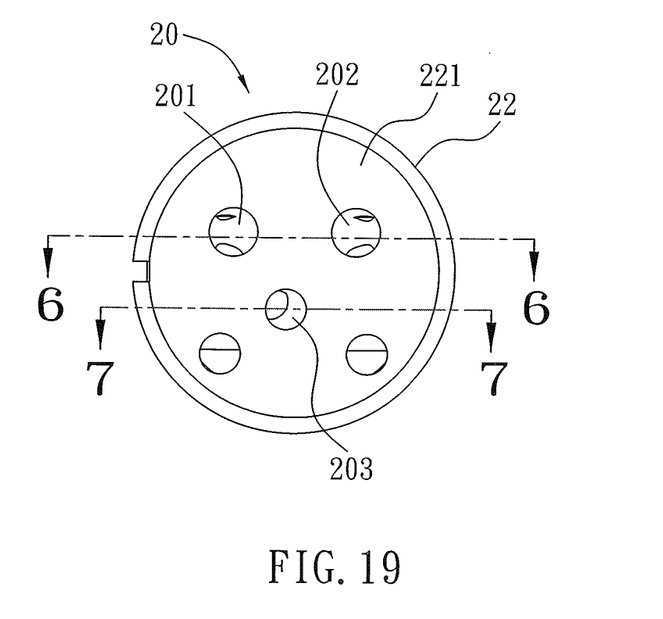
FIG. 19 is a side plane view showing the assembly of a part of the touch faucet according to the second embodiment of the present invention.
Figure 20:
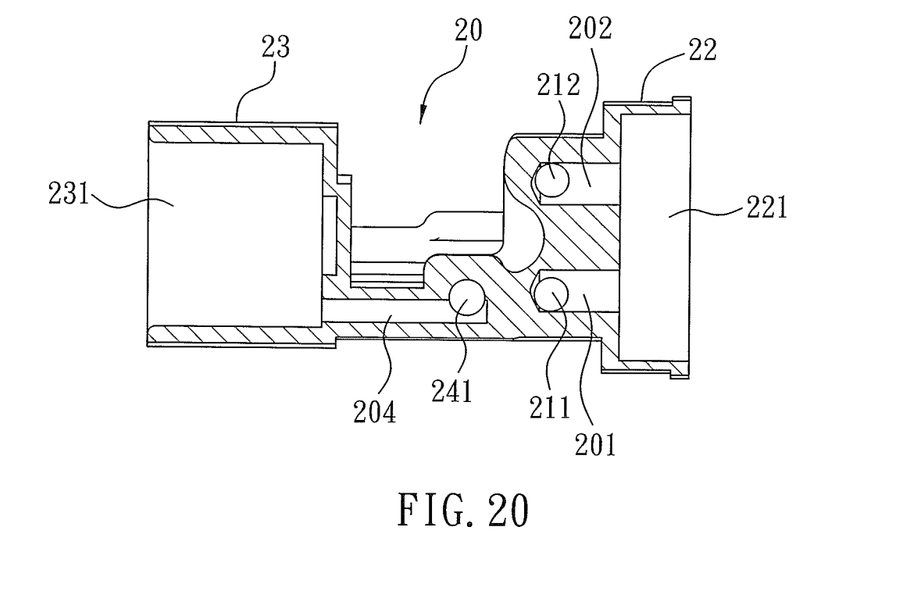
FIG. 20 is a cross sectional view taken along the line of 6-6 of FIG. 19.
Figure 21:
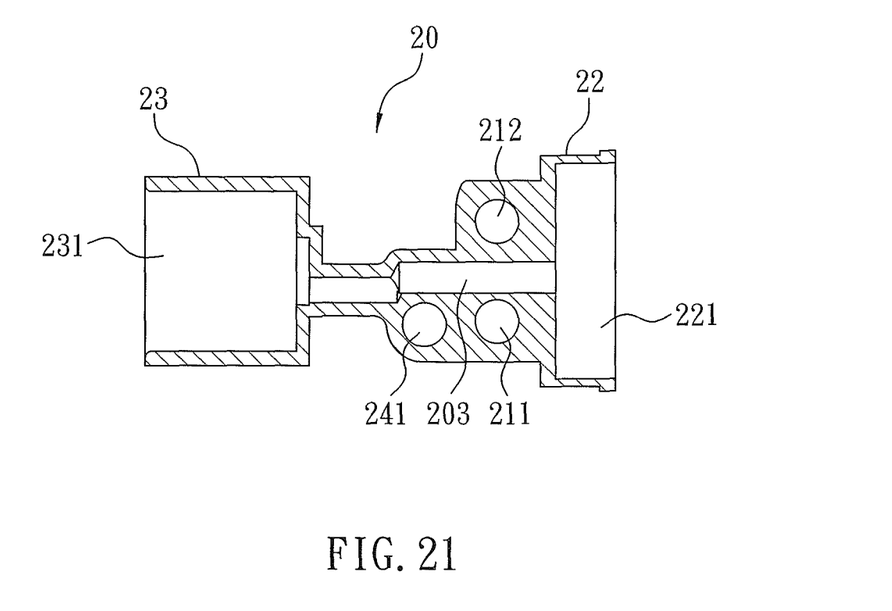
FIG. 21 is a cross sectional view taken along the line of 7-7 of FIG. 19.
Figure 22:
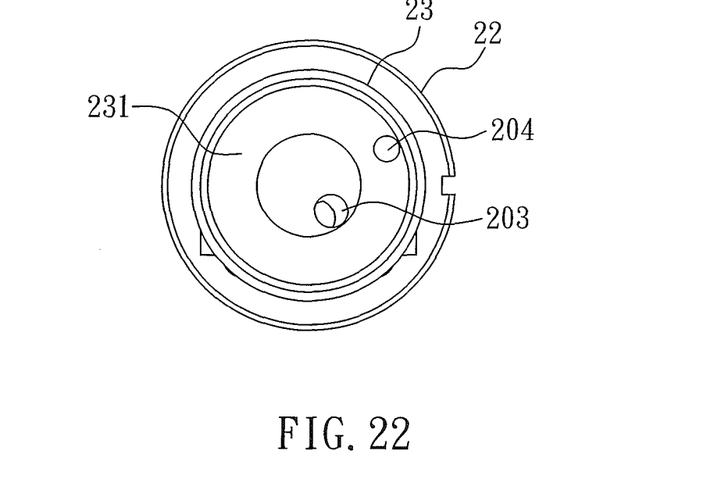
FIG. 22 is another side plane view showing the assembly of a part of the touch faucet according to the second embodiment of the present invention.

Referring to FIG. 18, the inflow portion 21 and the outflow portion 24 are located on the bottom of the connector 20, hence after the cold-water inlet pipe 51 and the hot-water inlet pipe 52 enter the inlet segment 11 of the body 10, they connect with the cold-water inlet 211 and the hot-water inlet 212 of the connector 20, respectively, and the water inflow end 71 of the hose 70 is coupled with the outlet 241 easily.

In an actual test, action force of the actuation device 43 to drive the province valve 42 is less than 12 newton (N). In other words, the saving water valve 42 is started after the user presses the press member 432 at less than 12 newton (N) easily.

The control valve assembly 30 and the touch valve assembly 40 are fixed on a central axis so that they are in connection with the connector 20 easily and the hot water, the cold water, and the mixing water flow smoothly in the touch faucet 1, 3.

The control valve assembly 30 is operated manually and automatically. Preferably, the control valve assembly 30 is an electronically thermostatic control valve assembly or a button temperature control valve assembly. The touch faucet 1, 3 contains the connector 20 connected with the touch valve assembly 40 so as to start and stop the water flow quickly.

Preferably, when the control valve assembly 30 is in a closing state, the touch valve assembly 40 does not operate, and when the touch faucet 1, 3 is not used for a long period of time, the control valve assembly 30 is switched to the closing state so as to avoid water pressure acting on the touch valve assembly 40, thus prolonging service life of the province valve 42. In addition, when the control valve assembly 30 and the touch valve assembly 40 are closed, the water does not leak from the outlet segment 12 of the outlet pipe 102 or the spray head 60.

When water supply is required constantly, the control valve assembly 30 is switched to an opening state, and specific water flow and water temperature are adjusted so as to start the touch faucet 1, 3 quickly by pressing the press member 431.

Accordingly, the province valve 42 is fixed in the touch valve assembly 40 so that the press member 432 of the actuation device 43 is pressed by the user to drive the driving post 421 of the province valve 42 to move, thus starting and stopping the water quickly. Furthermore, the province valve 30 saves water consumption.

Preferably, the press member 431 is pressed to drive the province valve 42 so as to avoid touching the province valve 42 directly and to maintain cleanness of the province valve 42.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A touch faucet comprising:
   a body including an inlet segment, an outlet segment, a first connecting part, a second connecting part, and an accommodation chamber defined between the first connecting part and the second connecting part;
   a connector housed in the accommodation chamber of the body, and the connector including an inflow portion configured to guide water flow; a first coupling portion located opposite to the first connecting part of the body and communicating with the inflow portion; a second coupling portion located opposite to the second connecting part of the body and communicating with the first coupling portion; and an outflow portion communicating with the second coupling portion and the outlet segment of the body so that the water flow enters into the outlet segment;
   a touch valve assembly connected with the second connecting part of the body and including a positioning cylinder joined with the second coupling portion, wherein the positioning cylinder has at least one through orifice communicating with the first coupling portion and the outflow portion, a province valve is in connection with the positioning cylinder and has a driving post configured to drive the province valve, such that the water flow enters into the at least one through orifice from the first coupling portion via the positioning cylinder; the touch valve assembly also includes an actuation device, at least one part of which extends out of the body so as to be operated by user and to drive the driving post of the province valve to move.

2. The touch faucet as claimed in claim 1 further comprising a water inflow assembly, and the water inflow assembly including a cold-water inlet pipe and a hot-water inlet pipe; wherein the inflow portion of the connector has a cold-water inlet connected with the cold-water inlet pipe so as to guide cold water into the first coupling portion, and the inflow portion of the connector has a hot-water inlet coupled with the hot-water inlet pipe so as to guide hot water into the first coupling portion.

3. The touch faucet as claimed in claim 2, wherein the control valve assembly includes a joining part and an operation lever configured to drive the joining part.

4. The touch faucet as claimed in claim 3, wherein the first coupling portion has a first retaining groove; the joining part has a casing defined between the first connecting part and the first retaining groove; a valve core mounted in the casing; and a rotary shaft extending out of the casing and pulled and rotated by the operation lever; the rotary shaft is pulled to start the cold water flowing into the second coupling portion from the cold-water inlet via the joining part and to start the hot water flowing into the second coupling portion from the hot-water inlet via the joining part; the rotary shaft is rotated to adjust a mixing temperature and a mixing flow of the cold water and the hot water in the second coupling portion.

5. The touch faucet as claimed in claim 2, wherein the outflow portion of the connector has an outlet, and the body includes a holder and an outlet pipe fitted with the holder on which the inlet segment, the outlet segment, the first connecting part, and the second connecting part form; the outlet pipe forms the outlet segment of the body; and the outlet connects with the outlet pipe.

6. The touch faucet as claimed in claim 5, wherein the body further includes a fitting mount and a fitting column connecting with the fitting mount; the fitting mount is accommodated in the holder and is fitted with the outlet pipe; and the fitting column is in connection with the outlet, such that the outlet of the connector communicates with the outlet pipe and the fitting mount via the fitting column.

7. The touch faucet as claimed in claim 5, wherein the inflow portion is located on a bottom of the connector, and the outflow portion is located on a top of the connector.

8. The touch faucet as claimed in claim 2, wherein the second coupling portion has a second retaining groove; the positioning cylinder includes a housing cavity, a receiving groove defined on a bottom of the housing cavity, and an aperture passing through a bottom of the receiving groove, wherein the at least one through orifice communicates with the second coupling portion via the housing cavity; the province valve is accommodated between the housing cavity and the second retaining groove, and the driving post is housed in the receiving groove; the actuation device includes a drive rod extending into the receiving groove from the aperture so as to drive the driving post of the province valve to move.

9. The touch faucet as claimed in claim 8, wherein the actuation device further includes a press member exposing outside the second connecting part so as to be pressed by the user, and the second connecting part drives the press member; the drive rod has a limiting segment limited in the receiving groove and configured to drive the driving post to move.

10. The touch faucet as claimed in claim 2 further comprising a spray head pulled out of and retracted back to an outlet segment of a body; a hose having a water inflow end and a water outflow end, wherein the water outflow end is coupled with the spray head so that the hose is pulled outwardly or is retracted inwardly with the spray head.

11. The touch faucet as claimed in claim 10, wherein the inflow portion and the outflow portion are located on a bottom of the connector.

12. The touch faucet as claimed in claim 1, wherein an action force of the actuation device to drive the province valve is less than 12 newton (N).

13. The touch faucet as claimed in claim 1, wherein the control valve assembly and the touch valve assembly are fixed on a central axis.

* * * * *